United States Patent [19]

Odenwalder et al.

[11] Patent Number: 5,909,434
[45] Date of Patent: Jun. 1, 1999

[54] BRIGHT AND BURST MODE SIGNALING DATA TRANSMISSION IN AN ADJUSTABLE RATE WIRELESS COMMUNICATION SYSTEM

[75] Inventors: Joseph P. Odenwalder, Del Mar; Brian K. Butler; Edward G. Tiedemann, Jr., both of San Diego, all of Calif.; Ephraim Zehavi, Haifa, Israel

[73] Assignee: Qualcomm Incorporated, San Diego, Calif.

[21] Appl. No.: 08/656,652

[22] Filed: May 31, 1996

[51] Int. Cl.⁶ .................................................... H04B 7/216
[52] U.S. Cl. ........................ 370/342; 370/468; 370/914; 375/200; 371/43.2
[58] Field of Search ...................... 370/328, 329, 370/335–337, 465, 468, 467, 479, 493, 537, 538, 540, 342, 543, 545, 914, 498, 528, 522; 375/200, 225, 341; 371/5.1, 37.01, 37.02, 67.1, 68.1, 43.1, 43.2, 47.1, 37.05

[56] References Cited

U.S. PATENT DOCUMENTS

| | | | |
|---|---|---|---|
| 5,383,219 | 1/1995 | Wheatley, III et al. | 370/468 |
| 5,408,502 | 4/1995 | How | 375/340 |
| 5,438,590 | 8/1995 | Tzukerman et al. | 375/340 |
| 5,442,625 | 8/1995 | Gitlin et al. | 370/342 |
| 5,461,639 | 10/1995 | Wheatley, III et al. | 375/205 |
| 5,509,020 | 4/1996 | Iwakiri et al. | 371/43 |
| 5,515,375 | 5/1996 | DeClerck | 370/335 |
| 5,519,779 | 5/1996 | Proctor et al. | 380/34 |
| 5,566,206 | 10/1996 | Butler et al. | 375/225 |
| 5,581,575 | 12/1996 | Zehavi et al. | 370/335 |
| 5,657,325 | 8/1997 | Lou et al. | 370/334 |

FOREIGN PATENT DOCUMENTS

| | | | |
|---|---|---|---|
| 9501032 | 1/1995 | WIPO | H04L 25/02 |
| 9508888 | 3/1995 | WIPO | H04L 25/02 |
| 9512943 | 5/1995 | WIPO | H04L 25/02 |

*Primary Examiner*—Douglas W. Olms
*Assistant Examiner*—Seema S. Rao
*Attorney, Agent, or Firm*—Russell B. Miller; Bruce W. Greenhaus; Tom Streeter

[57] ABSTRACT

A novel and improved method and apparatus for generating a constant data rate channel supporting signaling data transmission in an adjustable rate wireless communication system is described. In accordance with one aspect of the invention the rate at which the channel operates may be adjusted based on the particular use and environmental conditions such that the appropriate data rate up to a maximum capability can be achieved. User data is then placed into frames based on the selected rate. When available, signaling data is added into each frames in a predetermined amount. The resulting frame is encoded, repeated and punctured based on the selected rate and whether signaling data has been introduced, and transmitted via RF signals to the receive system. Upon reception, the frame is processed in accordance with having only user data and with having signaling data. That is, the frame is processed both as if it had signaling data and as if no signaling data were present. Once the frame is processed, the particular processing that is more likely to be correct is determined via error checking. If the signaling data processed frame is more likely to have be correct, the signaling data is separated from the user data and each processed accordingly. If the non-signaling data processing is determined to be more likely to be correct, the frame is processed as if it were entirely comprised of user data.

16 Claims, 6 Drawing Sheets

BRIGHT AND BURST MODE SIGNALING DATA TRANSMISSION IN AN ADJUSTABLE RATE WIRELESS COMMUNICATION SYSTEM

BACKGROUND OF THE INVENTION

I. Field of the Invention

The present invention relates to wireless telecommunications. More particularly, the present invention relates to a novel and improved method and apparatus for supporting signaling data transmission in an adjustable rate wireless communication system.

II. Description of the Related Art

Figure 1:
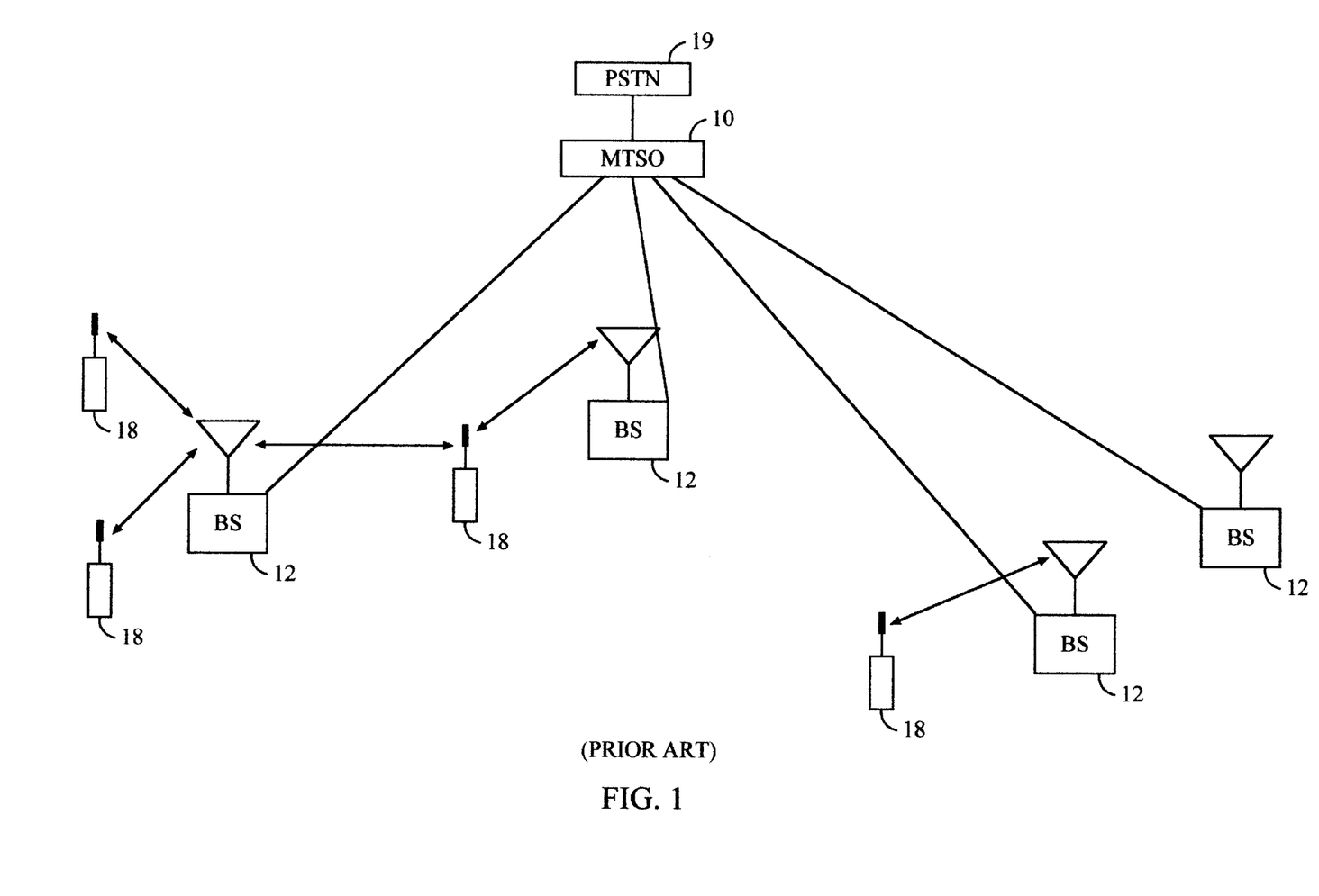
FIG. 1 is a diagram of a network configured in accordance with the prior art.

FIG. 1 is a highly simplified illustration of a cellular telephone system configured in accordance with the use of digital signal processing techniques. To conduct a telephone call or other communication, a wireless interface is established between a subscriber unit 18 and one or more base stations 12 using digitally modulated radio frequency (RF) signals. Each wireless interface is comprised of a forward link transmission from the base station 12 to the subscriber unit 18 and a reverse link transmission from the subscriber unit 18 to the base station 12. Typically, one or more channels are established within the forward and reverse link transmission which include a forward traffic channel and a reverse traffic channel over which the user data such as voice or digital data is transmitted. Using one or more wireless interfaces, a subscriber unit 18 communicates with other systems by way of mobile telephone switching office (MTSO) 10, including public switched telephone network (PSTN) 19, and any other systems coupled thereto. Typically, MTSO 10 is coupled to PSTN 19 and to base stations 12 via wire line links including, for example, T1 or E1 links, the use of which is well known in the art.

In addition to digitized voice and other digitized user data, cellular telephone systems must transmit signaling data via the wireless link. Signaling data is used to control and exchange information between the various subsystems that make up the cellular telephone network. The transmission of signaling data via the wireless link is typically performed by establishing a second set of channels in the forward and reverse link transmissions specifically designated for the transmission of signaling data over the wireless link, or by multiplexing the signaling data onto the traffic channels while temporarily reducing or suspending the transmission of the user data. In many instances, multiplexing the user data and signaling data over a single traffic channel is preferred because processing a single channel at the receive system is less complex than processing a set of channels. Various systems and methods for transmitting user data and signaling data via single traffic channel are disclosed in pending U.S. patent applications Ser. No. 08/171,146 entitled "METHOD AND APPARATUS FOR THE FORMATTING OF DATA FOR TRANSMISSION", now U.S. Pat. No. 5,504,773, Ser. No. 08/374,444 entitled "METHOD AND APPARATUS FOR THE FORMATTING OF DATA FOR TRANSMISSION", now U.S. Pat. No. 5,568,473, as well as issued patents U.S. Pat. No. 5,103,459 entitled "SYSTEM AND METHOD FOR GENERATING SIGNAL WAVEFORMS IN A CDMA CELLULAR TELEPHONE SYSTEM" and U.S. Pat. No. 4,901,307 entitled "SPREAD SPECTRUM MULTIPLE ACCESS COMMUNICATION SYSTEM USING SATELLITE OR TERRESTRIAL REPEATERS" each of which is assigned to the assignee of the present invention.

Since the initial development of many digital cellular telecommunications systems, the need for higher data rate wireless telecommunication systems has developed, as well as for wireless telecommunication systems that operate at a greater variety of data rates. Additionally, some new wireless applications require that a constant user data transmission rate be provided. In the context of these new applications, temporarily reducing or suspending the transmission of user data to allow signaling data to be transmitted is not feasible. Therefore, to satisfy these new requirements the present invention is directed to providing wireless telecommunication capability at a wide variety of transmission rates without the need to reduce the user data transmission rate in order to send signaling data. Additionally, to avoid increased complexity, the present invention is directed to providing this capability via the use of a single traffic channel.

SUMMARY OF THE INVENTION

The present invention is a novel and improved method and apparatus for providing a constant data rate channel supporting signaling data transmission in an adjustable rate wireless communication system. In accordance with one aspect of the invention the rate at which the channel operates may be adjusted based on the particular use and environmental conditions such that the appropriate data rate up to a maximum capacity can be achieved. In the exemplary embodiment, user data is placed into 20 ms frames based on the selected rate. When available, signaling data is added into each 20 ms frame in a predetermined amount. The resulting frame is encoded, repeated and punctured based on the selected rate and whether signaling data has been introduced, and transmitted via RF signals to the receive system. Upon reception, the frame is processed in accordance with having only user data and with having signaling data. That is, the frame is processed both as if no signaling data were present and as if it had signaling data. Once the frame is processed, the particular processing that is more likely to be correct is determined via error checking. If the signaling data processed frame is more likely to be correct, the signaling data is separated from the user data and each processed accordingly. If the non-signaling data processing is determined to be more likely to be correct, the frame is processed as if it were entirely comprised of user data.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for supporting signaling data transmission in an adjustable rate wireless communication system is described. In the following description, the invention is set forth in the context of a radio frequency signal interface operating in accordance with the use of code division multiple access (CDMA) physical signal modulation techniques. While the described invention is especially suited for use with such signal modulation techniques, the use of other digital wireless telecommunication protocols is consistent with the practice of the present invention. Furthermore, it should be understood that the present invention is intended for use with various types of communication systems including satellite based communication systems, point to point wireless communication systems and wireline systems including co-axial cable communication systems.

Figure 2:
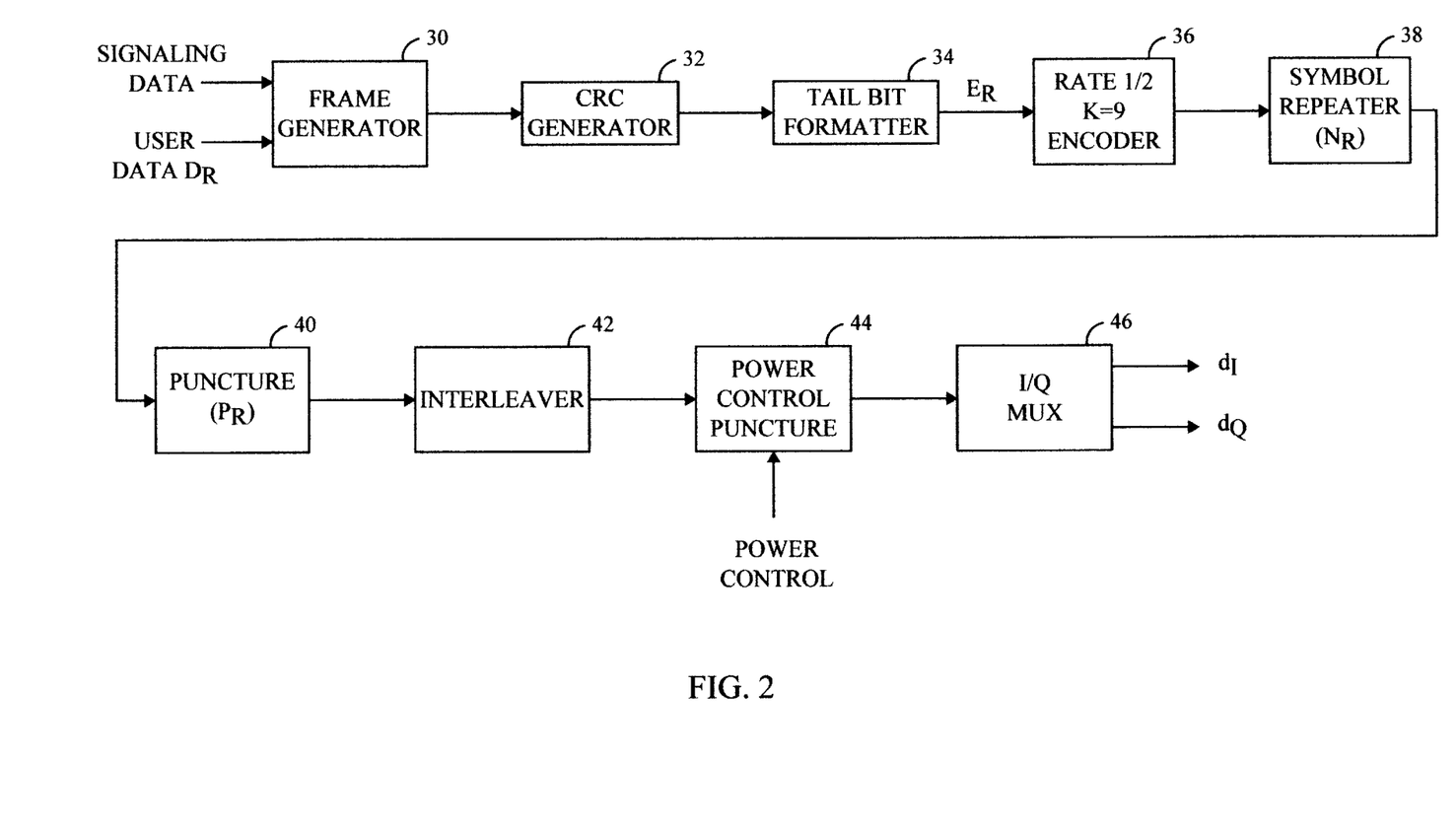
FIG. 2 is a block diagram of a transmit encoding system configured in accordance with one embodiment of the invention.
Figure 3:
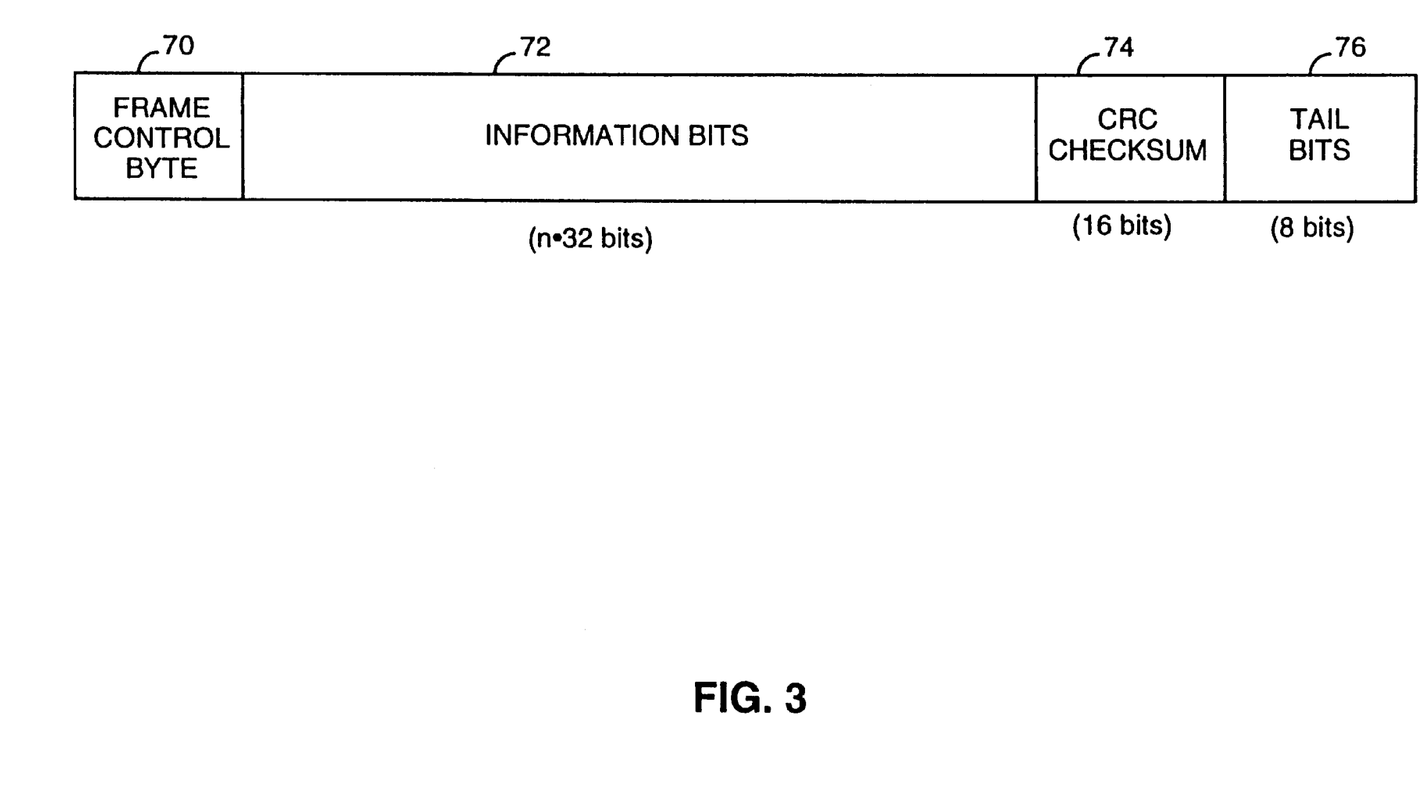
FIG. 3 is a block diagram of data frame configured in accordance with one embodiment of the invention.

FIG. 2 is a block diagram of the traffic channel data encoding portion of a base station when configured in accordance with an exemplary embodiment of the invention. User data is applied at any one of a variety of data rates $D_R$ to frame generator 30 along with signaling data if present. Frame generator 30 places the user data into 20 ms frames in integer multiples of 32 bits and adds a frame control byte. In one embodiment, the frame control byte is comprised of multiplexer sublayer format bits, the signaling start of message bit, erasure indicator bit, and the packet header bits. If signaling data is queued for transmission, frame generator 30 places an additional 32 bits of the signaling data in the frame. CRC generator 32 generates a 16 bit checksum value for each frame received from frame generator 30 and tail bit generator 34 adds 8 tail bits to each frame received from CRC generator 32. The tail bits are comprised of eight logic zeros in the exemplary embodiment of the invention and provides a known state at the end of the decoding process. A diagram illustrating the contents of a frame in accordance with the exemplary embodiment after processing by tail bit formatter 34 is shown in FIG. 3. As illustrated, the control byte 70 is positioned at the front of the frame, followed by an integer multiple n of 32 information bits 72, CRC check sum 74 and the encoder tail byte 76.

Referring again to FIG. 2, convolution encoder 36 performs rate (R) ½, length (K) 9, convolutional encoding on each frame received from tail bit formatter 34, thereby generating two code symbols for each bit in the frame. For purposes of this application the rate at which data is received by convolutional encoder 36 is referred to as the encoder input rate ($E_R$) and therefore the symbol rate from convolutional encoder 36 is $2E_R$. The encoder input rate $E_R$ is in turn dependent on the data input rate $D_R$ and whether signaling data is being transmitted. Symbol repeater 38 repeats each symbol within a frame received $N_R$ times, where $N_R$ also depends on the encoder input rate $E_R$, thus making the number of code symbols per frame from symbol repeater 38 equal to $2E_R N_R$. Puncture 40 receives the output of symbol repeater 38 and removes symbols from the frame in accordance with a ratio of symbols removed to total symbols ($P_R$) that depends on the transmission rate. Interleaver 42 receives the output of puncture 40 and in the exemplary embodiment block interleaves each frame to create time independence between the symbols.

Power control puncture 44 further punctures the interleaved frame with power control data that is used to control the power at which the reverse link traffic channel from the subscriber unit 18 is transmitted. The power control data indicates to the subscribers whether its transmission power is adequate. The mobile station adjusts its gain in response to these messages. This type of closed loop power control is described in detail in U.S. Pat. No. 5,056,109 entitled "METHOD AND APPARATUS FOR CONTROLLING TRANSMISSION POWER IN A CDMA CELLULAR MOBILE TELEPHONE SYSTEM", and incorporated by reference herein. In the preferred embodiment of the invention the power control data is comprised of a logic high or logic low bit written over two code symbols that indicates whether subscriber unit 18 should increase or decrease the power at which it transmits the reverse link signal. I/Q multiplexer 46 receives the output of power control puncture 44 and alternately outputs the received symbols to the $d_I$ and $d_Q$ outputs, thereby generating in-phase symbol stream $d_I$ and a quadrature-phase code symbol stream $d_Q$. The $d_I$ and $d_Q$ are then applied to a modulation system for transmission to a subscriber unit 18.

Figure 4:
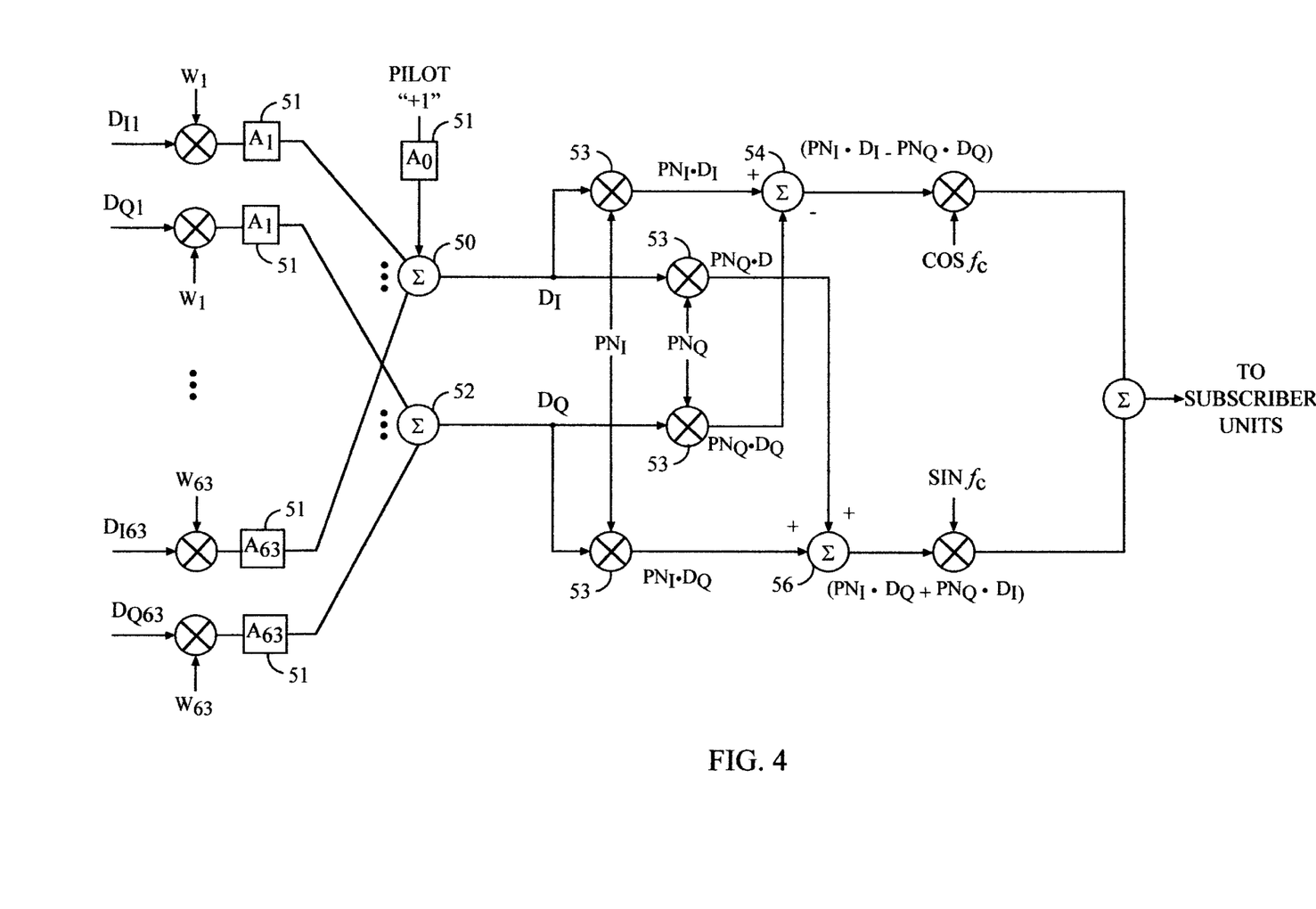
FIG. 4 is a block diagram of a transmit modulation system when configured in accordance with one embodiment of the invention.

FIG. 4 is a block diagram of a modulation system configured in accordance with the exemplary embodiment that modulates multiple sets of in-phase and quadrature-phase symbol streams $d_{I1-63}$ and $d_{Q1-63}$ including the set of $d_I$ and $d_Q$ code symbol streams generated as described above with respect to FIG. 2. Each set of code symbol streams $d_I$ and $d_Q$ is directed to a different subscriber unit 18. The multiple sets of in-phase $d_{I1-63}$ and quadrature-phase symbol streams $d_{I1-63}$ and $d_{Q1-63}$ are each modulated with one of sixty four orthogonal Walsh codes $W_{i=1...63}$, with each Walsh code being comprised of sixty-four Walsh chips, thereby generating modulation symbols at a rate of 64 times the code symbol rate. The resulting Walsh modulation symbols are gain adjusted according to gain adjust factors $A_{1...63}$ by gain adjusters 51. The set of in-phase modulation symbols are summed by in-phase summer 50 yielding summed in-phase modulation symbols $D_I$, and the set of quadrature-phase modulation symbols are summed by quadrature-phase summer 52 yielding summed quadrature-phase modulation symbols $D_Q$. Additionally, pilot data comprising of all logic 1's is gain adjusted according to gain adjust factor $A_0$ by another gain adjuster 51, and summed into the in-phase modulation symbols $D_I$ by summer 50. Those skilled in the art will recognize that performing no Walsh code modulation on the pilot data is effectively modulating pilot data with the $W_O$ Walsh code which is comprised of all logic ones.

The summed modulation symbols $D_I$ and $D_Q$ are modulated with an in-phase pseudorandom spreading code $PN_I$ and quadrature-phase pseudorandom spreading code $PN_Q$ using multipliers 53 as shown yielding products $PN_I \cdot D_I$, $PN_Q \cdot D_I$, $PN_I \cdot D_Q$, and $PN_Q \cdot D_Q$. Modulation by a pseudorandom code is described in detail in the aforementioned U.S. Pat. Nos. 5,103,459 and 4,901,307. Summer 54 then sums the product $PN_I \cdot D_I$, with the negative of the product $PN_Q \cdot D_Q$, and summer 56 sums the product $PN_I \cdot D_Q$ with the product $PN_Q \cdot D_I$. The output of summer 54 is bandpass filtered (not shown) and modulated with an in-phase sinusoidal carrier signal ($\cos(\omega_c t)$), and the output of summer 56 is also bandpass filtered (not shown) and modulated with an quadrature-phase sinusoidal carrier ($\sin(\omega_c t)$), and the resulting modulated RF signals are summed, amplified (not shown), and transmitted. Those skilled in the art will recognize the above described modulation with the $PN_I$ and $PN_Q$ spreading codes using multipliers 53 and summers 54 and 56 is complex multiplication of the summed data $D_I$ and $D_Q$ with the spreading codes $PN_I$ and $PN_Q$. While the use of a complex multiplication modulation scheme is preferred because it facilitates the transmission of different types of data via the in phase and quadrature-phase channels created by the $PN_I$ and $PN_Q$ spreading codes, other spread spectrum modulation schemes are consistent with the use of the present invention and will be apparent to one skilled in the art.

Table I provides a set of values for $N_R$ and $P_R$ for a range of encoder input rates $E_R$ in accordance with the preferred embodiment of the invention.

TABLE I

| Data Input Rate ($D_R$) (kb/s) | n | Encoder Input Rate (ER) | $N_R$ | Total Symbols | Puncture Rate ($P_R$) | Punctured Symbols/ Frame | Symbols/ Frame |
|---|---|---|---|---|---|---|---|
| 0 | 0 | 1.6 | 12 | 768 | 0 | 0 | 768 |
| 1.6 | 1 | 3.2 | 6 | 768 | 0 | 0 | 768 |
| 3.2 | 2 | 4.8 | 4 | 768 | 0 | 0 | 768 |
| 4.8 | 3 | 6.4 | 3 | 768 | 0 | 0 | 768 |
| 6.4 | 4 | 8.0 | 3 | 960 | 1 of 5 | 192 | 768 |
| 8.0 | 5 | 9.6 | 2 | 768 | 0 | 0 | 768 |
| 9.6 | 6 | 11.2 | 2 | 896 | 1 of 7 | 128 | 768 |
| 11.2 | 7 | 12.8 | 2 | 1024 | 1 of 4 | 256 | 768 |
| 12.8 | 8 | 14.4 | 2 | 1152 | 1 of 3 | 384 | 768 |
| 14.4 | 9 | 16.0 | 2 | 1280 | 2 of 5 | 512 | 768 |
| 16.0 | 10 | 17.6 | 2 | 1408 | 5 of 11 | 640 | 768 |
| 17.6 | 11 | 19.2 | 1 | 768 | 0 | 0 | 768 |
| 19.2 | 12 | 20.8 | 1 | 832 | 1 of 13 | 64 | 768 |
| 20.8 | 13 | 22.4 | 1 | 896 | 1 of 7 | 128 | 768 |
| 22.4 | 14 | 24.0 | 1 | 960 | 1 of 5 | 192 | 768 |
| 24.0 | 15 | 25.6 | 1 | 1024 | 1 of 4 | 256 | 768 |
| 25.6 | 16 | 27.2 | 1 | 1088 | 5 of 17 | 320 | 768 |
| 27.2 | 17 | 28.8 | 1 | 1152 | 1 of 3 | 384 | 768 |
| 28.8 | 18 | 30.4 | 1 | 1216 | 7 of 19 | 448 | 768 |
| 30.4 | 19 | 32.0 | 1 | 1280 | 2 of 5 | 512 | 768 |

Various additional rates and totals are provided as well including the rate of information bits transmitted, the total number of code symbols generated per frame by symbol repeater 38, and the actual number of code symbols punctured from each frame.

From Table I it can be seen that the symbol repetition rate $N_R$ and puncture rate $P_R$ are maintained such that the total number of code symbols per frame actually transmitted equals 768, which corresponds to a code symbol rate of 38,400 symbols per second. In particular, the repetition rate $N_R$ is set to the lowest integer which will generate 768 or more code symbols per frame, and the puncture rate is set such that the number of code symbols above 768 generated by that repetition are removed. It should be understood, however, that the use of codes symbol totals other than 768 are consistent with the practice the present invention. When the 768 code symbols are divided into an in-phase portion and a quadrature-phase portion by I/Q multiplexer 46, the number of code symbols per frame in each portion becomes 384. This sets the code symbol rate for the I and Q channels to 19,200 symbols per second, which when modulated using a sixty four bit Walsh code for each symbol yields a modulation code or chip rate of 1.2288 Megachips per second that can be transmitted within traditional CDMA channels. The spreading codes $PN_I$ and $PN_Q$ are then applied at the Walsh code chip rate. Thus, data may be transmitted at anyone of a variety of rates using the same channel and spreading codes applied at the same coding and spreading rate. Additionally, by increasing the transmission rate, signaling data may be transmitted in addition to any user data. This in turn, allows a single RF processing and signal modulation system to be used for transmitting both user and signaling data, which reduces the complexity and cost of implementing such a system, and maintains a degree of compatibility with prior art systems having a reduced number of variable transmission rates and single transmission rates.

During an exemplary communication a user data transmission rate, $U_R$ (user data rate) is first selected from the set of input data rate $D_R$ rates provided in Table I. The user data rate $U_R$ selection can be performed based on various parameters including the particular type of communication being conducted or the environmental conditions, or both. If the type of communication is considered, the user data rate $U_R$ can be fixed to a predetermined amount within the system, or established via exchange of signaling messages, in alternative embodiments of the invention. If the environmental conditions are considered, the system will typically attempt to transmit at ever increasing rates until the error rate at the subscriber unit reaches the highest acceptable level, and the resulting rate used is the user data rate $U_R$. Periodically, attempts to increase the transmission rate may be made to determine if environmental conditions have changed such that higher transmission rates have become feasible. Other methods of determining the best user data rate $U_R$, will be apparent to one skilled in the art. Additionally, in one embodiment of the invention, base station 12 transmits a signaling message to a subscriber unit 18 indicating when the transmission rate should be increased or decreased. In alternative embodiments of the invention these signaling messages are generated in response to measured conditions including the number of calls being made, the amount of interference detected, the error rate of the call, or a combination thereof.

Once a user data rate $U_R$ has been established, signaling data may be transmitted by temporarily increasing the transmission rate to a signaling data rate $S_R$ and transmitting the signaling data using the additional capacity provided by this increase in transmission rate. During this temporary increase in the transmission rate, the processing of the frame is altered accordingly as described above including adjusting the symbol repetition rate $N_R$ and puncture rates $P_R$. In the exemplary embodiment of the invention, the signaling data rate $S_R$ is the next highest transmission rate specified in Table I, and therefore allows 32 bits of signaling data to be transmitted in each frame. Frames including signaling data are transmitted at signaling data rate $S_R$, until the entire signaling message is sent. In an exemplary transmission data is transmitted at user data rate $U_R$ of 24 kbits per second during normal operation, and therefore the symbol repetition rate $N_R$ set to 1 and the bits punctured to total bit ratio $P_R$ set to 1 of 4. When signaling data is present, the rate is increased to a signaling data rate $S_R$ of 25.6 bits per second with the symbol repetition rate remaining at one, but the bits punctured to total bit ratio $P_R$ is increased to 5 of 17. Thus, user data may continue to be transmitted at the user data rate $U_R$ while signaling data is also transmitted.

In an alternative exemplary embodiment of the invention, the user data rate $U_R$ selected represents only the maximum data rate of a set of data rates used to transmit a particular type of data. That is, once user data rate $U_R$ and $N_R$ are selected, data may be transmitted in accordance with the selected user data rate $U_R$, or at one or a set of lower rates. In the preferred implementation of this embodiment, each lower rate is approximately one half the next higher rate creating a set of rates comprised of, for example, a full rate, a half rate, a quarter rate, and an eighth rate. These lower data rates may be generated by performing code symbol duplication within either encoder 36 or interleaver 42. The gain adjust performed on this channel during the transmission of the data at these lower rates is then reduced by the same ratio as the reduction in rate to reduce the amount of interference generated. The use of rate sets in this manner is useful for transmission of time sensitive data which is generated in highly variable amounts such as voice, audio or video information.

Figure 5:
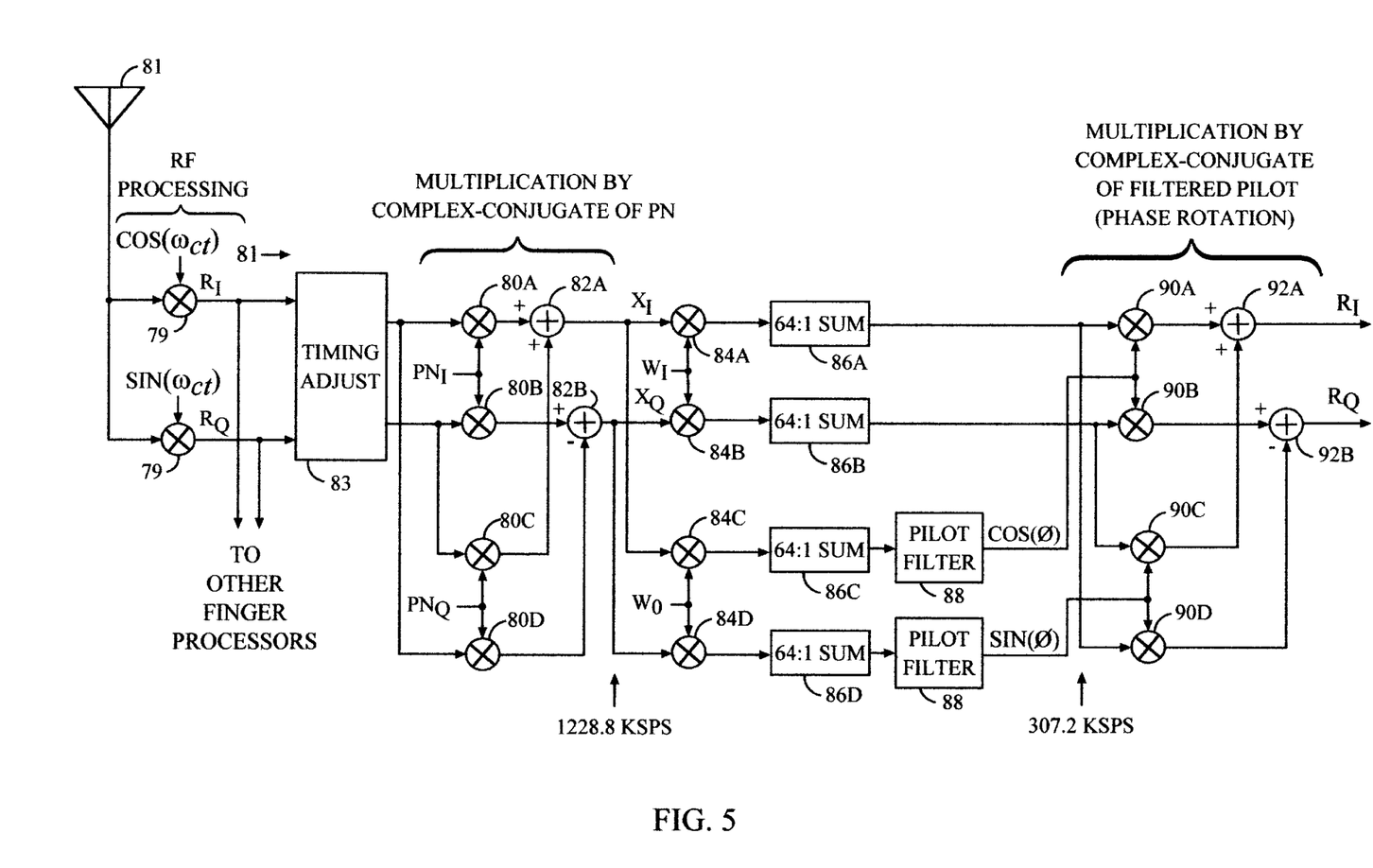
FIG. 5 is a block diagram of a receive demodulation system configured in accordance with one embodiment of the invention.

FIG. 5 is a block diagram of a portion of the receive processing system at subscriber unit 18 when configured in accordance with one embodiment of the invention. During RF processing, which is shown in highly simplified form, the RF signals received by antenna 81 are amplified and bandpassed filtered to the 1.2288 spectrum (not shown), digitized (not shown), and downconverted to baseband by mixing with in-phase carrier sinusoid ($\cos(\omega_c t)$) and quadrature-phase carrier sinusoid ($\sin(\omega_c t)$) using multipliers 79, thereby generating in-phase receive samples $R_I$ and quadrature-phase receive samples $R_Q$ at a rate of 1.2288 Megachips per second. In-phase and quadrature-phase receive samples $R_I$ and $R_Q$ are applied to finger processor 81 as well as to other finger processors which are not shown for ease of drawing. Finger processor 81 processes one instance of the forward link signal while the other finger processors process other instances, if available, with each instance generated via multipath phenomenon. The use of only one finger processor is consistent with the invention however.

Within finger processor 81, timing adjust 83 adjusts the timing of the receive samples to allow synchronization and later combination with the other instances of the forward link signal, although the timing adjust may be performed at other points in the processing of the forward link signal in alternative embodiments of the invention. A complex-conjugate multiplication is then performed between the time adjusted in-phase and quadrature-phase samples $R_I$ and $R_Q$ and the $PN_I$ and $PN_Q$ codes using multipliers 80a–d and adders 82a–b, yielding a first product $X_I = R_I \cdot PN_I + R_Q \cdot PN_Q$ and a second product $X_Q = R_I \cdot PN_Q - R_Q \cdot PN_I$. The first and second products $X_I$ and $X_Q$ are then modulated and summed over the sixty four Walsh code bits of a traffic channel Walsh code $W_i$, and pilot channel Walsh code $W_0$ using multipliers 84a–d and summers 86a–d. The $W_0$ modulation yields reference symbols for coherent demodulation and scaling at a rate of 19.2 kilosymbols per second which are filtered using pilot filters 88. In the preferred embodiment of the invention pilot filters 88 calculate the average value over a series of Walsh symbols, although various other methods of pilot filtering will be apparent to one skilled in the art. A second complex-conjugate multiplication is then performed between the results of the traffic channel Walsh code demodulation and the pilot reference estimations using multipliers 90a–d and adders 92a–b, which phase shifts the traffic channel data to zero radians yielding scaled soft decision data $r_I$ and $r_Q$, since the pilot data transmitted consists of all logic zeros.

Figure 6:
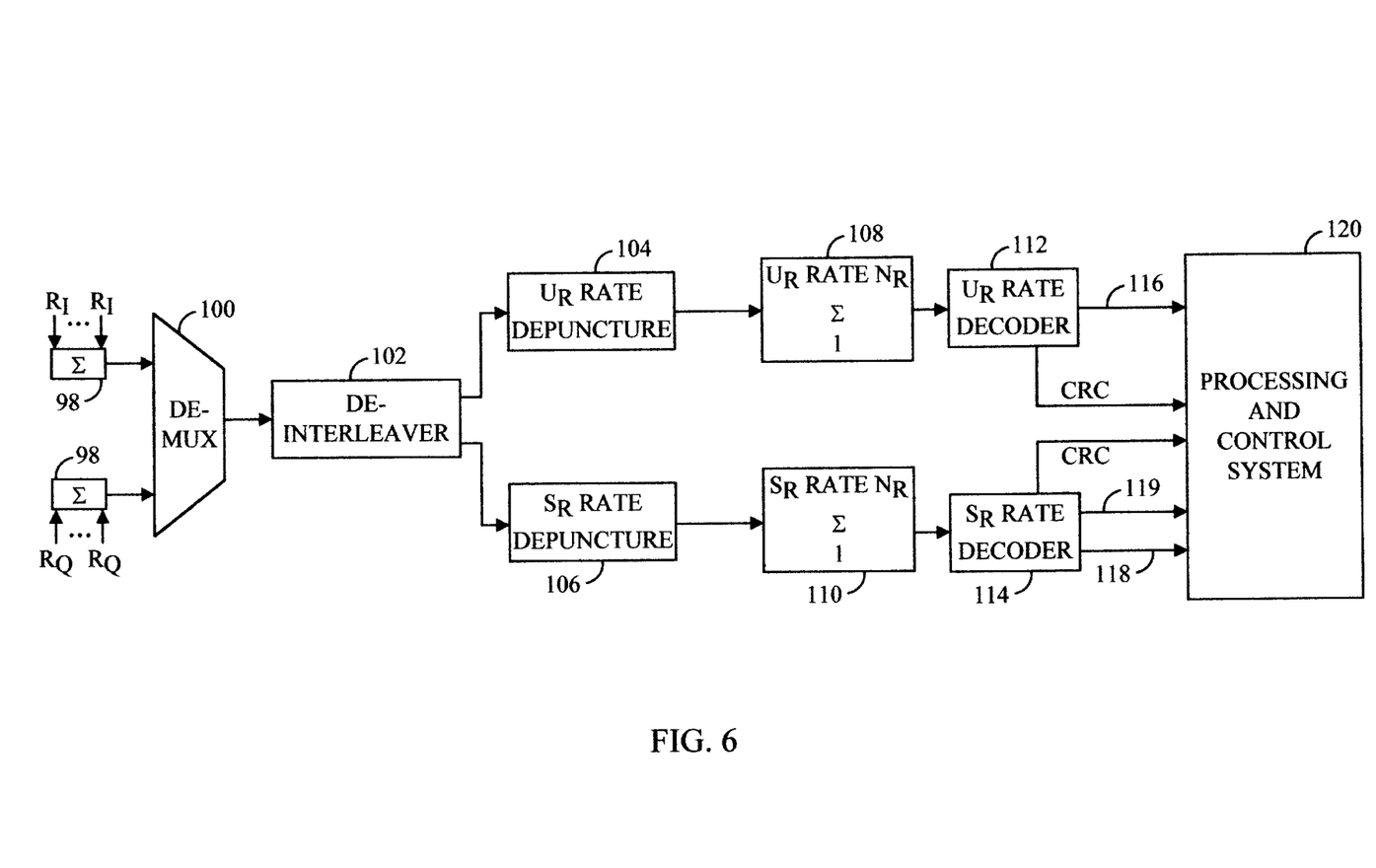
FIG. 6 is a block diagram of a receive decoder system configured in accordance with one embodiment of the invention.

FIG. 6 is a block diagram of the decoder used by a subscriber unit 18 when configured in accordance with one embodiment of the invention. The soft decision data $r_I$ and $r_Q$ from the set of finger processors including finger processor 81 are summed by summers 98, and the summed soft decision data samples is received by demultiplexer 100 which demultiplexes the data into a single stream. Deinterleaver 102 deinterleaves the data in 768 symbol blocks and $U_R$ depuncture 104 and $S_R$ depuncture 106 each receive a single instance of the deinterleaved data. $U_R$ depuncture 104 depunctures the deinterleaved data at the user data rate $U_R$ by inserting erasure or neutral symbols in accordance with the puncturing as set forth in Table I. An erasure or neutral symbol is one that will not influence the result of any subsequent convolutional decoding performed on the data. In a bipodal signal having its logic level determined by whether it is at either a high voltage level or a low voltage level, the neutral value will be the midpoint between the high voltage level and the low voltage level. In the preferred embodiment of the invention the neutral value will be zero, since the low voltage level and high voltage level are above and below zero volts by equal amounts. Similarly, depuncture 106 depunctures the deinterleaved data at the next higher rate as shown on Table I by inserting neutral symbols in accordance with the puncture rate associated with the signaling data rate $S_R$.

$U_R$ summer 108 and $S_R$ summer 110 receive the depunctured data from $U_R$ depuncture 104 and $S_R$ depuncture 106 respectively, and sum the data of $N_R$ symbols. The value $N_R$ used by $U_R$ summer 108 is set according to the $N_R$ associated with the user data rate $U_R$, as specified by Table I. The value $N_R$ used by the $S_R$ summer 108 is set according to the $N_R$ associated with the rate one above the user data rate as specified by Table I. $U_R$ decoder 112 and $S_R$ decoder 114 perform Viterbi decoding of the data received from $U_R$ and $S_R$ summers 108 and 110 respectively at the decoding rate associated with the user data rate $U_R$ and the next higher rate respectively, producing $U_R$ rate data 116 and $S_R$ rate data 118. Additionally, $U_R$ and $S_R$ decoders 112 and 114 each generate CRC check sum results. $U_R$ data 116, $S_R$ data 118, and signaling data 119, along with the associated CRC check sum results are then provided to processing and control system 120 which selects the correct data rate based on whether the associated CRC check sum is correct. In one embodiment of the invention, if both CRC check sums indicate success, or neither indicated success, both rate one data 114 and rate two data 116 will be rejected, and a retransmit required. The use of other error detection methods such a reencoded serial error rate or Yamamoto metrics in addition to or instead of CRC checksums is also consistent with the practice of the present invention. In the embodiment of the invention incorporating the use of rate sets, $U_R$ and $S_R$ decoders 112 and 114 perform multiple decoders at each of the possible rates in the rate set, and provide additional error detection information so that the correct rate of processing can be determined by processing and control system 120.

Thus, a method and apparatus for supporting signaling data transmission is an adjustable rate wireless communication system has been described. Various alternative embodiments of the above described invention will be apparent to one skilled in the art. The above described embodiment is provided for purposes of illustration, and should not be taken to limit the scope of the present invention which is set forth in the following claims.

We claim:

1. A method for performing wireless communication comprising the steps of:

transmitting data at a first rate selected from a set of rates separated from one another by a first amount of data per time interval if no signaling data is to be transmitted;

transmitting said data at a second rate selected from said set of rates which is greater than said first rate by said first amount of data per time interval if said signaling data is to be transmitted;

repeating said data a repetition amount $N_R$ based on whether said first rate or said second rate is selected; and puncturing said data by a puncture amount $P_R$ such that a predetermined amount of said data is remaining, thereby generating punctured data;

wherein said repetition amount $N_R$ and said puncture amount $P_R$ are based on said first rate as follows:

| | | | |
|---|---|---|---|
| $N_R = 12$ and | $P_R = 0$ | when said first rate is | 0 kbits per second; |
| $N_R = 6$ and | $P_R = 0$ | when said first rate is | 1.6; |
| $N_R = 4$ and | $P_R = 0$ | when said first rate is | 3.2; |
| $N_R = 3$ and | $P_R = 0$ | when said first rate is | 4.8; |
| $N_R = 3$ and | $P_R = 1/5$ | when said first rate is | 6.4; |
| $N_R = 2$ and | $P_R = 0$ | when said first rate is | 8.0; |
| $N_R = 2$ and | $P_R = 1/7$ | when said first rate is | 9.6; |
| $N_R = 2$ and | $P_R = 1/4$ | when said first rate is | 11.2; |
| $N_R = 2$ and | $P_R = 1/3$ | when said first rate is | 12.8; |
| $N_R = 2$ and | $P_R = 2/5$ | when said first rate is | 14.4; |
| $N_R = 2$ and | $P_R = 5/11$ | when said first rate is | 16.0; |
| $N_R = 1$ and | $P_R = 0$ | when said first rate is | 17.6; |
| $N_R = 1$ and | $P_R = 1/13$ | when said first rate is | 19.2; |
| $N_R = 1$ and | $P_R = 1/7$ | when said first rate is | 20.8; |
| $N_R = 1$ and | $P_R = 1/5$ | when said first rate is | 22.4; |
| $N_R = 1$ and | $P_R = 1/4$ | when said first rate is | 24.0; |
| $N_R = 1$ and | $P_R = 5/17$ | when said first rate is | 25.6; |
| $N_R = 1$ and | $P_R = 1/3$ | when said first rate is | 27.2; |
| $N_R = 1$ and | $P_R = 7/9$ | when said first rate is | 28.8; and |
| $N_R = 1$ and | $P_R = 2/5$ | when said first rate is | 30.4. |

2. A method for performing wireless communication comprising the steps of:

transmitting data at a first rate selected from a set of rates separated from one another by a first amount of data per time interval if no signaling data is to be transmitted;

transmitting said data at a second rate selected from said set of rates which is greater than said first rate by said first amount of data per time interval if said signaling data is to be transmitted; and repeating said data a repetition amount $N_R$ based on whether said first rate or said second rate is selected;

wherein said repetition amount $N_R$ is based on said first rate as follows:

| | | |
|---|---|---|
| $N_R = 12$ | when said first rate is | 0 kbits per second; |
| $N_R = 6$ | when said first rate is | 1.6; |
| $N_R = 4$ | when said first rate is | 3.2; |
| $N_R = 3$ | when said first rate is | 4.8; |
| $N_R = 3$ | when said first rate is | 6.4; |
| $N_R = 2$ | when said first rate is | 8.0; |
| $N_R = 2$ | when said first rate is | 9.6; |
| $N_R = 2$ | when said first rate is | 11.2; |
| $N_R = 2$ | when said first rate is | 12.8; |
| $N_R = 2$ | when said first rate is | 14.4; |
| $N_R = 2$ | when said first rate is | 16.0; |
| $N_R = 1$ | when said first rate is | 17.6; |
| $N_R = 1$ | when said first rate is | 19.2; |
| $N_R = 1$ | when said first rate is | 20.8; |
| $N_R = 1$ | when said first rate is | 22.4; |
| $N_R = 1$ | when said first rate is | 24.0; |
| $N_R = 1$ | when said first rate is | 25.6; |
| $N_R = 1$ | when said first rate is | 27.2; |
| $N_R = 1$ | when said first rate is | 28.8; and |
| $N_R = 1$ | when said first rate is | 30.4. |

3. A method for performing wireless communication comprising the steps of:

transmitting data at a first rate selected from a set of rates separated from one another by a first amount of data per time interval if no signaling data is to be transmitted;

transmitting said data at a second rate selected from said set of rates which is greater than said first rate by said first amount of data per time interval if said signaling data is to be transmitted;

repeating said data a repetition amount $N_R$ based on whether said first rate or said second rate is selected; and puncturing said data by a puncture amount $P_R$ such that a predetermined amount of said data is remaining, thereby generating punctured data;

wherein said punctured amount $P_R$ is based on said first rate as follows:

| | | |
|---|---|---|
| $P_R = 0$ | when said first rate is | 0 kbits per second; |
| $P_R = 0$ | when said first rate is | 1.6; |
| $P_R = 0$ | when said first rate is | 3.2; |
| $P_R = 0$ | when said first rate is | 4.8; |
| $P_R = 1/5$ | when said first rate is | 6.4; |
| $P_R = 0$ | when said first rate is | 8.0; |
| $P_R = 1/7$ | when said first rate is | 9.6; |
| $P_R = 1/4$ | when said first rate is | 11.2; |
| $P_R = 1/3$ | when said first rate is | 12.8; |
| $P_R = 2/5$ | when said firt rate is | 14.4; |
| $P_R = 5/11$ | when said first rate is | 16.0; |
| $P_R = 0$ | when said first rate is | 17.6; |
| $P_R = 1/13$ | when said first rate is | 19.2; |
| $P_R = 1/7$ | when said first rate is | 20.8; |
| $P_R = 1/5$ | when said first rate is | 22.4; |
| $P_R = 1/4$ | when said first rate is | 24.0; |
| $P_R = 5/17$ | when said first rate is | 25.6; |
| $P_R = 1/3$ | when said first rate is | 27.2; |
| $P_R = 7/9$ | when said first rate is | 28.8; and |
| $P_R = 2/5$ | when said first rate is | 30.4. |

4. A method for performing wireless communication comprising the steps of:

transmitting data at a first rate selected from a set of rates separated from one another by a first amount of data per time interval if no signaling data is to be transmitted;

transmitting said data at a second rate selected from said set of rates which is greater than said first rate by said first amount of data per time interval if said signaling data is to be transmitted;

repeating said data a repetition amount $N_R$ based on whether said first rate or said second rate is selected;

puncturing said data by a puncture amount $P_R$ such that a predetermined amount of said data is remaining, thereby generating punctured data;

generating CRC checksum information based on said data; and adding a tail byte and said CRC checksum information to said data before performing said repeating step;

wherein said signaling data is added in an amount equal to said predetermined amount; and wherein said predetermined amount is equal to 32 bits and said CRC checksum information contains 16 bits of data.

5. A method for receive processing a digital RF signal comprising the steps of:

demodulating the digital RF signal to produce a stream of soft decision data;

deinterleaving said soft decision data;

depuncturing said soft decision data in accordance with a first transmission rate to generate first depunctured data;

depuncturing said soft decision data in accordance with a second transmission rate to generate second depunctured data;

decoding said first depunctured data to generate first decoded data and first checksum data; and decoding said second depunctured data to generate second decoded data and second checksum data;

wherein said first puncture amount $P_R$ is based on said first rate as follows:

| | | |
|---|---|---|
| $P_R = 0$ | when said first rate is | 0 kbits per second; |
| $P_R = 0$ | when said first rate is | 1.6; |
| $P_R = 0$ | when said first rate is | 3.2; |
| $P_R = 0$ | when said first rate is | 4.8; |
| $P_R = 1/5$ | when said first rate is | 6.4; |
| $P_R = 0$ | when said first rate is | 8.0; |
| $P_R = 1/7$ | when said first rate is | 9.6; |
| $P_R = 1/4$ | when said first rate is | 11.2; |
| $P_R = 1/3$ | when said first rate is | 12.8; |
| $P_R = 2/5$ | when said first rate is | 14.4; |

6. A system for generating an RF signal for wireless communication comprising:

means for detecting signaling data; and signal processing means for transmitting data at a first rate selected from a set of rates separated from one another by a first amount of data per time interval if no signaling data is to be transmitted, and transmitting said data at a second rate selected from said set of rates which is greater than said first rate by said first amount of data per time interval if said signaling data is to be transmitted;

wherein said signal processing means repeats said data a repetition amount $N_R$ based on whether said first rate or said second rate is selected;

wherein said signal processing means punctures said data by a puncture amount $P_R$ such that a predetermined amount of said data is remaining, thereby generating punctured data; and wherein said repetition amount $N_R$ and said puncture amount $P_R$ are based on said first rate as follows:

| | | | |
|---|---|---|---|
| $N_R = 12$ and | $P_R = 0$ | when said first rate is | 0 kbits per second; |
| $N_R = 6$ and | $P_R = 0$ | when said first rate is | 1.6; |
| $N_R = 4$ and | $P_R = 0$ | when said first rate is | 3.2; |
| $N_R = 3$ and | $P_R = 0$ | when said first rate is | 4.8; |
| $N_R = 3$ and | $P_R = 1/5$ | when said first rate is | 6.4; |
| $N_R = 2$ and | $P_R = 0$ | when said first rate is | 8.0; |
| $N_R = 2$ and | $P_R = 1/7$ | when said first rate is | 9.6; |
| $N_R = 2$ and | $P_R = 1/4$ | when said first rate is | 11.2; |
| $N_R = 2$ and | $P_R = 1/3$ | when said first rate is | 12.8; |
| $N_R = 2$ and | $P_R = 2/5$ | when said first rate is | 14.4; |
| $N_R = 2$ and | $P_R = 5/11$ | when said first rate is | 16.0; |
| $N_R = 1$ and | $P_R = 0$ | when said first rate is | 17.6; |
| $N_R = 1$ and | $P_R = 1/13$ | when said first rate is | 19.2; |
| $N_R = 1$ and | $P_R = 1/7$ | when said first rate is | 20.8; |
| $N_R = 1$ and | $P_R = 1/5$ | when said first rate is | 22.4; |
| $N_R = 1$ and | $P_R = 1/4$ | when said first rate is | 24.0; |
| $N_R = 1$ and | $P_R = 5/17$ | when said first rate is | 25.6; |
| $N_R = 1$ and | $P_R = 1/3$ | when said first rate is | 27.2; |
| $N_R = 1$ and | $P_R = 7/9$ | when said first rate is | 28.8; and |
| $N_R = 1$ and | $P_R = 2/5$ | when said first rate is | 30.4. |

7. A system for generating an RF signal for wireless communication comprising:

means for detecting signaling data; and signal processing means for transmitting data at a first rate selected from a set of rates separated from one another by a first amount of data per time interval if no signaling data is to be transmitted, and transmitting said data at a second rate selected from said set of rates which is greater than said first rate by said first amount of data per time interval if said signaling data is to be transmitted;

wherein said signal processing means repeats said data a repetition amount $N_R$ based on whether said first rate or said second rate is selected;

wherein said repetition amount $N_R$ is based on said first rate as follows:

| | | |
|---|---|---|
| $N_R = 12$ | when said first rate is | 0 kbits per second; |
| $N_R = 6$ | when said first rate is | 1.6; |
| $N_R = 4$ | when said first rate is | 3.2; |
| $N_R = 3$ | when said first rate is | 4.8; |
| $N_R = 3$ | when said first rate is | 6.4; |
| $N_R = 2$ | when said first rate is | 8.0; |
| $N_R = 2$ | when said first rate is | 9.6; |
| $N_R = 2$ | when said first rate is | 11.2; |
| $N_R = 2$ | when said first rate is | 12.8; |
| $N_R = 2$ | when said first rate is | 14.4; |
| $N_R = 2$ | when said first rate is | 16.0; |
| $N_R = 1$ | when said first rate is | 17.6; |
| $N_R = 1$ | when said first rate is | 19.2; |
| $N_R = 1$ | when said first rate is | 20.8; |
| $N_R = 1$ | when said first rate is | 22.4; |
| $N_R = 1$ | when said first rate is | 24.0; |
| $N_R = 1$ | when said first rate is | 25.6; |
| $N_R = 1$ | when said first rate is | 27.2; |
| $N_R = 1$ | when said first rate is | 28.8; and |
| $N_R = 1$ | when said first rate is | 30.4. |

8. A system for generating an RF signal for wireless communication comprising:

means for detecting signaling data; and signal processing means for transmitting data at a first rate selected from a set of rates separated from one another by a first amount of data per time interval if no signaling data is to be transmitted, and transmitting said data at a second rate selected from said set of rates which is greater than said first rate by said first amount of data per time interval if said signaling data is to be transmitted;

wherein said signal processing means repeats said data a repetition amount $N_R$ based on whether said first rate or said second rate is selected;

wherein said signal processing means punctures said data by a puncture amount $P_R$ such that a predetermined amount of said data is remaining, thereby generating punctured data;

wherein said puncture amount $P_R$ is based on said first rate as follows:

| | | |
|---|---|---|
| $P_R = 0$ | when said first rate is | 0 kbits per second; |
| $P_R = 0$ | when said first rate is | 1.6; |
| $P_R = 0$ | when said first rate is | 3.2; |
| $P_R = 0$ | when said first rate is | 4.8; |
| $P_R = 1/5$ | when said first rate is | 6.4; |
| $P_R = 0$ | when said first rate is | 8.0; |
| $P_R = 1/7$ | when said first rate is | 9.6; |
| $P_R = 1/4$ | when said first rate is | 11.2; |
| $P_R = 1/3$ | when said first rate is | 12.8; |
| $P_R = 2/5$ | when said first rate is | 14.4; |
| $P_R = 5/11$ | when said first rate is | 16.0; |
| $P_R = 0$ | when said first rate is | 17.6; |
| $P_R = 1/13$ | when said first rate is | 19.2; |
| $P_R = 1/7$ | when said first rate is | 20.8; |
| $P_R = 1/5$ | when said first rate is | 22.4; |
| $P_R = 1/4$ | when said first rate is | 24.0; |
| $P_R = 5/17$ | when said first rate is | 25.6; |
| $P_R = 1/3$ | when said first rate is | 27.2; |
| $P_R = 7/9$ | when said first rate is | 28.8; and |
| $P_R = 2/5$ | when said first rate is | 30.4. |

9. A system for generating an RF signal for wireless communication comprising:

means for detecting signaling data; and signal processing means for transmitting data at a first rate selected from a set of rates separated from one another by a first amount of data per time interval if no signaling data is to be transmitted, and transmitting said data at a second rate selected from said set of rates which is greater than said first rate by said first amount of data per time interval if said signaling data is to be transmitted;

wherein said signal processing means repeats said data a repetition amount $N_R$ based on whether said first rate or said second rate is selected;

wherein said signal processing means punctures said data by a puncture amount $P_R$ such that a predetermined amount of said data is remaining, thereby generating punctured data;

wherein said signal processing means generates CRC checksum information based on said data, and adds a tail byte and said CRC checksum information to said data before performing said repeating step;

wherein said signaling data is added in an amount equal to said predetermined amount; and wherein said predetermined amount is equal to 32 bits and said CRC checksum information contains 16 bits of data.

10. A system for generating an RF signal for wireless communication comprising:

means for detecting signaling data; and signal processing means for transmitting data at a first rate selected from a set of rates separated from one another by a first amount of data per time interval if no signaling data is to be transmitted, and transmitting said data at a second rate selected from said set of rates which is greater than said first rate by said first amount of data per time interval if said signaling data is to be transmitted;

wherein said signal processing means repeats said data a repetition amount $N_R$ based on whether said first rate or said second rate is selected;

wherein said signal processing means punctures said data by a puncture amount $P_R$ such that a predetermined amount of said data is remaining, thereby generating punctured data; and wherein said amount $N_R$ is set to a first integer sufficient to generate at least a predetermined amount of data and said amount $P_R$ is set to a number of bits necessary to reduce said data to a predetermined number of bits.

11. A method for performing wireless communication comprising the steps of:

(a) transmitting frames of data each containing either substantially only user data or user data along with signaling data;

(b) receiving the frames of data; and (c) determining, for each individual received frame of data, whether the individual received frame of data includes substantially only user data or includes user data along with signaling data, wherein frames of data containing substantially only user data are transmitted at a first rate, wherein frames of data containing user data along with signaling data are transmitted at a second rate and wherein said determining step comprises:

(c.1) determining a first error detection value from the individual received frame of data by decoding the individual received frame of data at the first rate;

(c.2) determining a second error detection value from the individual received frame of data by decoding the individual received frame of data at the second rate; and (c.3) identifying the individual received frame of data as including either substantially only user data or user data along with signaling data in accordance with the first and second error detection values.

12. The method of claim 11 wherein the first rate is selected from a set of rates separated from one another by a first amount of data per time interval; and wherein the second rate is selected from said set of rates, said second rate being greater than said first rate by said first amount of data per time interval.

13. The method as set forth in claim 11 wherein said data is transmitted with CRC checksum information; and wherein steps (c.1) and (c.2) are implemented by performing CRC checksum tests.

14. A system for performing wireless communication comprising:

transmit means for transmitting frames of data each containing either substantially only user data or user data along with signaling data;

receive means for receiving the frames of data; and determination means for determining, for each individual received frame of data, whether the individual received frame of data includes substantially only user data or includes user data along with signaling data, wherein the transmit means transmits the frames of data containing substantially only user data at a first rate, wherein the transmit means transmits the frames of data containing user data along with signaling data at a second rate, said determination means including:

first error detection means for determining a first error detection value from the individual received frame of data by decoding the individual received frame of data at the first rate;

second error detection means for determining a second error detection value from the individual received frame of data by decoding the individual received frame of data at the second rate; and identification means for identifying the individual received frame of data as including either substantially only user data or user data along with signaling data in accordance with the first and second error detection values.

15. The system of claim 14 wherein the transmit means transmits the frames of data containing substantially only user data at a first rate selected from a set of rates separated from one another by a first amount of data per time interval; and wherein the transmit means transmits the frames of data containing user data along with signaling data at a second rate selected from said set of rates, said second rate being greater than said first rate by said first amount of data per time interval.

16. The system as set forth in claim 14 wherein said transmit means transmits data with CRC checksum information; and wherein the first and second error detection means each perform CRC checksum tests.

* * * * *